(12) United States Patent
Zhang

(10) Patent No.: US 10,939,504 B1
(45) Date of Patent: Mar. 2, 2021

(54) HAND WARMER WITH THE FUNCTION OF PORTABLE POWER SOURCE

(71) Applicant: Shenzhen Yilian Youchuang Network Co., LTD, Shenzhen (CN)

(72) Inventor: Jun Zhang, Gongan County (CN)

(73) Assignee: SHENZHEN YILIAN YOUCHUANG NETWORK CO., LTD, Shenzhen (CN)

( * ) Notice: Subject to any disclaimer, the term of this patent is extended or adjusted under 35 U.S.C. 154(b) by 0 days.

(21) Appl. No.: 16/778,185

(22) Filed: Jan. 31, 2020

(30) Foreign Application Priority Data

Nov. 20, 2019 (CN) .......................... 201911144220.0

(51) Int. Cl.
*H05B 3/22* (2006.01)
*H02J 7/00* (2006.01)
*H01M 10/052* (2010.01)

(52) U.S. Cl.
CPC ............ *H05B 3/22* (2013.01); *H01M 10/052* (2013.01); *H02J 7/0042* (2013.01); *H02J 7/0047* (2013.01); *H02J 7/0068* (2013.01); *H01M 2220/30* (2013.01)

(58) Field of Classification Search
CPC .. H05B 3/342; H01M 10/0525; H01M 10/44; H01M 10/623

USPC .......................................... 219/211, 487, 494
See application file for complete search history.

(56) References Cited

U.S. PATENT DOCUMENTS 10,104,720 B1 * 10/2018 Larue ....................... H05B 3/34
2004/0211769 A1 * 10/2004 Merk ..................... H02H 5/043
219/494

FOREIGN PATENT DOCUMENTS

CN          201404345 Y   *  2/2010

* cited by examiner

*Primary Examiner* — Thien S Tran

(57) ABSTRACT

The present application discloses a hand warmer with the function of portable power source, comprising an MCU control module, a heating sheet control module, a mobile power supply control module, and a lithium battery module, wherein the MCU control module is separately connected to the heating sheet control module, the mobile power supply control module and the lithium battery module, and the lithium battery module is further separately connected to the heating sheet control module and the mobile power supply control module. The hand warmer with the function of portable power source has a precise circuit design that allows users to precisely adjust the heating temperature as needed, and is well combined with a mobile power supply.

6 Claims, 4 Drawing Sheets

HAND WARMER WITH THE FUNCTION OF PORTABLE POWER SOURCE

CROSS-REFERENCE TO RELATED APPLICATION

The present application claims the priority of Chinese patent application No. 201911144220.0, filed on Nov. 20, 2019, which is hereby incorporated by reference in its entirety.

TECHNICAL FIELD

The disclosure relates to the field of electronic technology, and in particular to a hand warmer with the function of portable power source.

BACKGROUND

A hand warmer is an automatic heating and health care product developed by using physical and chemical principles. This product is popular for its unique and novel advantages such as automatic heat generation, fun and practicality.

Existing electronic devices for heating cannot simultaneously charge mobile electronic devices and accurately control the temperature of the surfaces of the heating devices, inconsistent temperature on two or more sides causes poor experience and the portability is insufficient, and so on.

SUMMARY

An objective of the present disclosure is to provide a hand warmer with the function of portable power source (or mobile power supply), so as to solve the problems proposed in the above background art.

In order to achieve the above objective, the present disclosure provides the following technical solution:

A hand warmer with the function of portable power source, comprising an Microcontroller Unit (MCU) control module, a heating sheet control module, a mobile power supply (or portable power source) control module, and a lithium battery module, wherein the MCU control module is separately connected to the heating sheet control module, the mobile power supply control module and the lithium battery module, wherein the lithium battery module is further separately connected to the heating sheet control module and the mobile power supply control module, wherein a heating source controlled by the heating control module is a heating sheet or a heating ceramic sheet, and wherein precise temperature control is performed on the heating sheet or the heating ceramic sheet by the MCU control module and the heating control module.

As a further embodiment of the present disclosure, the MCU control module comprises a single-chip microcomputer U1, an NTC detection module, and a position indicator light, wherein the single-chip microcomputer U1 is separately connected to the NTC detection module and the position indicator light.

As a further embodiment of the present disclosure, a control switch Si is provided on the single-chip microcomputer U1.

As a further embodiment of the present disclosure, the position indicator light uses an LCD display screen to indicate a position.

As a further embodiment of the present disclosure, the mobile power supply control module comprises a charging module, a charging and discharging amount indicating module, and a discharging module.

As a further embodiment of the present disclosure, the charging and discharging amount indicating module comprises a 25% indicator light, a 50% indicator light, a 75% indicator light, and a 100% indicator light.

Compared with the prior art, the present disclosure has the following beneficial effects: the hand warmer with the function of portable power source of the present disclosure has a precise circuit design that allows users to precisely adjust the heating temperature as needed, and is well combined with a mobile power supply.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, and not all the embodiments. All other embodiments obtained by those of ordinary skill in the art based on the embodiments of the present disclosure without creative efforts are within the scope of the present disclosure.

Please refer to FIGS. 1-4. Embodiment 1: in an embodiment of the present disclosure, a hand warmer with the function of portable power source includes an MCU control module, a heating sheet control module, a mobile power supply control module, and a lithium battery module, wherein the MCU control module is separately connected to a heating sheet control module, the mobile power supply control module and the lithium battery module, and the lithium battery module is further separately connected to the heating sheet control module and the mobile power supply control module.

Figure 1:
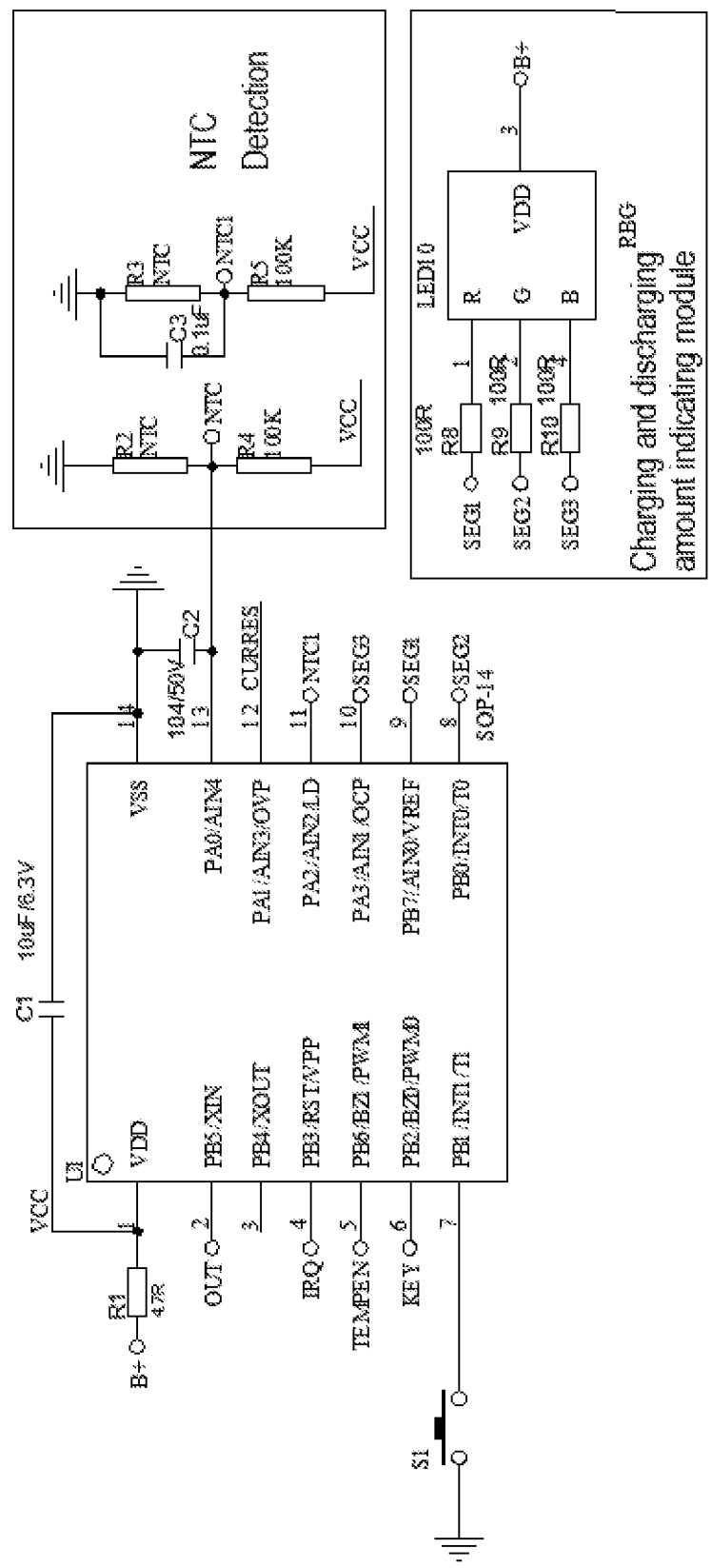
FIG. 1 is a circuit diagram of an MCU control module.
Figure 2:
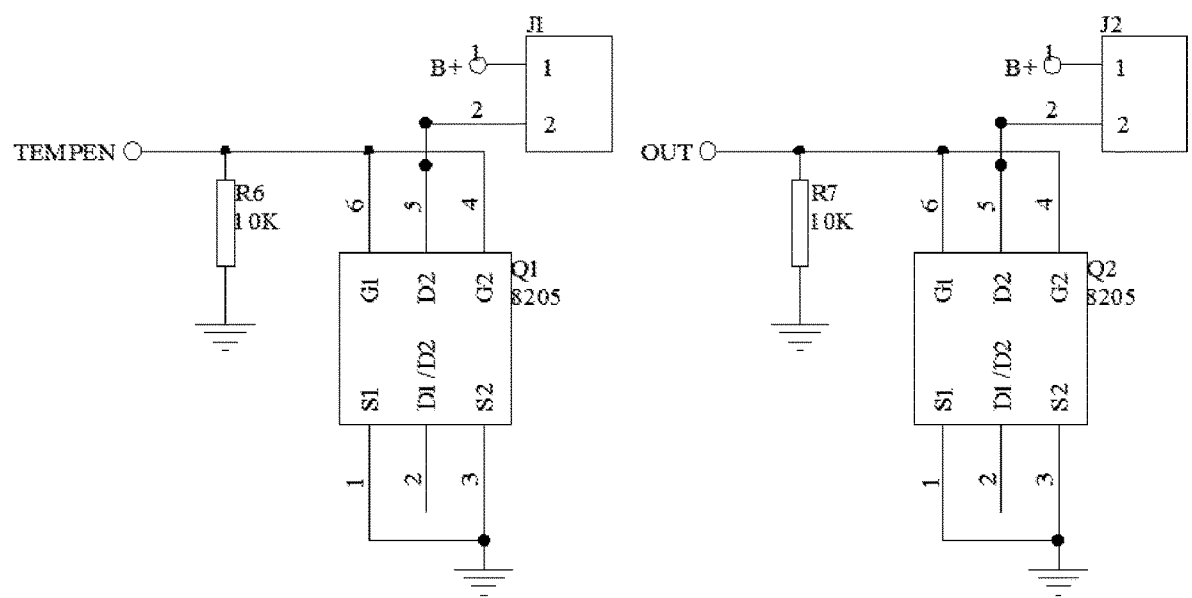
FIG. 2 is a circuit diagram of a heating sheet control module.

The MCU control module is as shown in FIG. 1. In the figure: 1. PIN1 and PIN14 are positive and negative pins of an MCU power supply; 2. PIN2 and PIN5 pins control the heating sheet to turn on and off; 3. PIN4 pin detects whether a USB2 charging port is charged or not; 4, PIN6 controls a IP5306 button pin; 5, PINT pin controls a heating plate and a mobile power supply button; 6, PIN8, PIN9, and PIN10 pins control RBG tri-color lights of an LED10; 7, PIN11 and PIN13 pins detect NTC temperature; and 8, PIN12 pin detects a USB output current.

Figure 3:
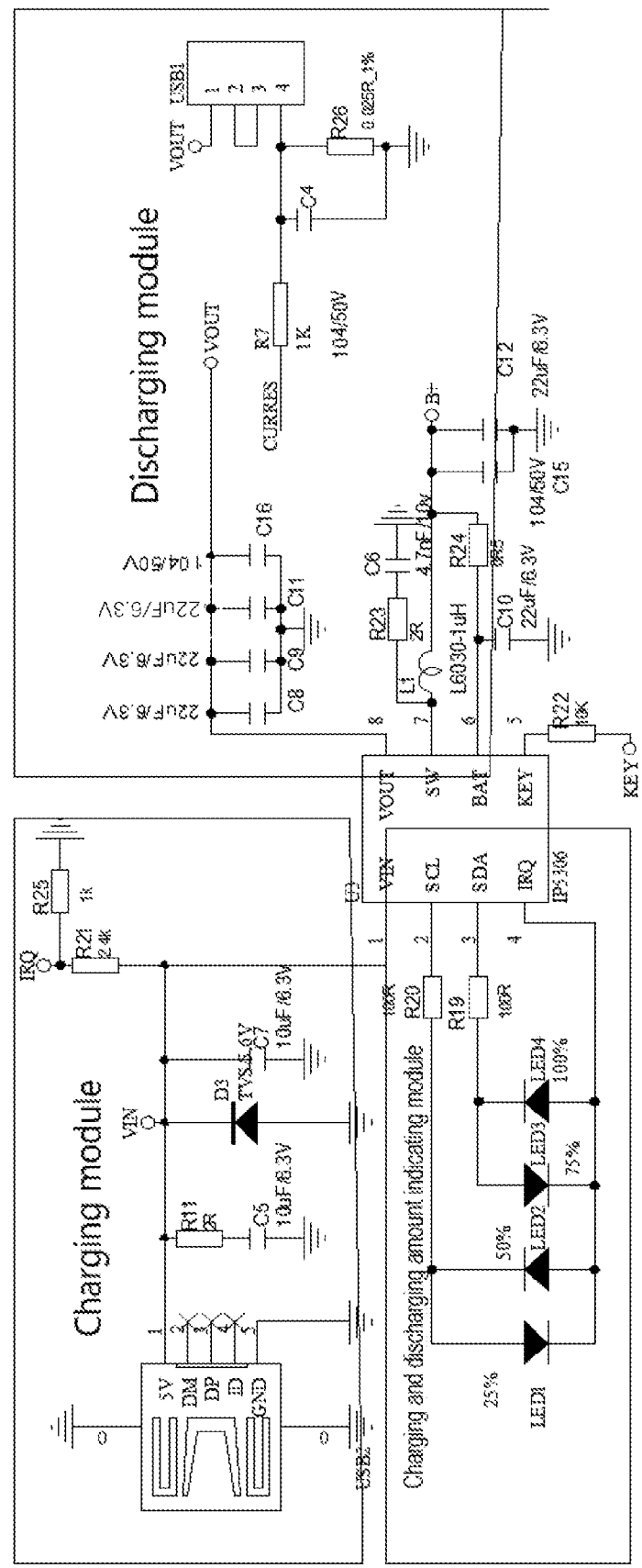
FIG. 3 is a circuit diagram of a mobile power supply control module.

The mobile power supply control module includes a charging module, a charge and discharge amount indicating module, and a discharge module. As shown in FIG. 3, a USB2 socket has a 5V charge voltage inserted, and four power amount lights LED1, LED2, LED3, and LED4 display a battery power amount. When the four lights are on for a long time, it shows that charging is completed. The MCU PIN4 pin detects that USB2 is charged, and the MCU turns off the heating sheet function.

In the charging process, IC IP5306 has voltage and overcharge protection: the MCU PIN7 pin button is short-pressed, IP5306 IC 5V output is turned on, and USB1 port output can have 5V output to supply power to an external device. When USB1 turns on the output, the four power amount indicator lights LED1, LED2, LED3, and LED4 indicate the battery power amount. The MCU PIN12 pin detects that there is an output from USB1, and the MCU will turn off the heating sheet function. MCU PIN13 pin detects the output current. MCU PIN9 controls the IP5306 button pin, thereby controlling on/off of the IPS306 output. In the discharging process, IC IP5306 has over-current, over-discharge and short circuit protection.

Figure 4:
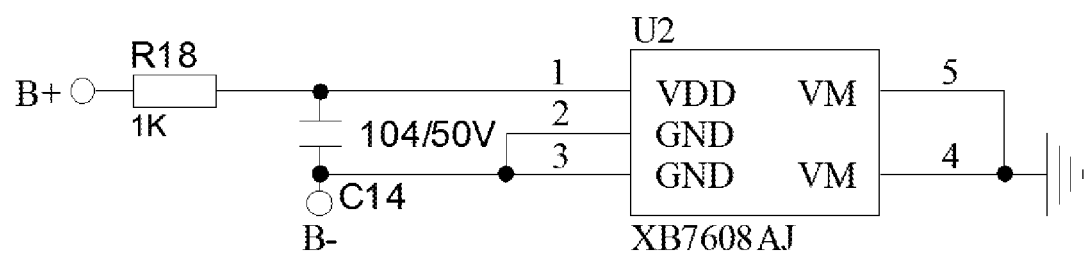
FIG. 4 is a circuit diagram of a lithium battery module.

The lithium battery module is as shown in FIG. 4. XB7608AJ IC is a lithium battery protection IC that provides functions of over-charging, over-discharging, and over-current in short-circuit for the battery, to protect the safety of the battery and PCBA board.

The button is long-pressed, the MCU PIN7 pin detects a long-press signal, enters a heating mode, turns on Q1 and Q2 MOS through the PIN2 and PIN5 pins, and a corresponding position light is on, and the heating sheet works. When the heating sheet works, the PIN11 and PIN13 pins detect the temperature. When the temperature detected by the PIN11 and PIN13 pins reaches a set value, the heating sheet is turned off. When the temperature detected by the PIN11 and PIN13 pins falls to a certain value, Q1 and Q2 are turned on again to control the temperature within a set position range. When the heating sheet works, the PIN7 pin button is short-pressed so that the temperature can be set in three positions: low, middle and high.

Embodiment 2: on the basis of Embodiment 1, the present design includes a mobile power supply portion and a hand warmer portion:

1. Mobile power supply portion: it adopts a built-in lithium polymer battery, is connected to PCBA (circuit board), intelligently identifies that a USB load is inserted and outputted in the PCBA (circuit board) for charging through an MCU circuit control program, and has output over-current, over-voltage and short circuit protection in the charging process. During charging of this product, many kinds of protection such as over-voltage, over-charging, over-discharging, over-current, and over-temperature protection of the whole machine are intelligently identified in the process of inserting and inputting a USB in the PCBA (circuit board).

2. Hand warmer portion:

2.1 By installing two upper and lower or more flexible heating copper sheet (film) or flexible heating ceramic sheet (film) devices on a metal thermally-conductive plate outside a product while connecting to the circuit board, and supplying power by the built-in lithium polymer battery, the upper and lower heating devices generates heat. In the heat generation process, the metal thermally-conductive plate attached on the outside conducts heat and dissipates heat evenly, and this process is controlled by a circuit control program.

2.2 The circuit contains important components such as an MCU, a MOS tube, an NTC (Negative Temperature Coefficient) temperature sensor. On/off of the hand warmer is controlled by pressing a button. It can be divided into three temperature positions: middle, high, and low. Three different light color indicators indicate different positions, or an LCD display screen displays a set temperature.

In the circuit, the MCU detects the NTC temperature change feedback, and controls the current of the heating device in real time to achieve accurate temperature control, enabling the users to meet their needs.

It would be obvious to those skilled in the art that the application is not limited to the details of the above-described exemplary embodiments, and the application can be implemented in other specific forms without departing from the spirit or essential features of the present disclosure. Therefore, no matter which point of view is chosen, the present embodiments are to be considered as illustrative and not restrictive, and the scope of the application is defined by the appended claims instead of the above description. Therefore, it is intended that all changes falling within the meaning and scope of equivalent elements of the claims are covered in the present disclosure. Any reference numerals in the claims should not be construed as limiting the claims.

In addition, it should be understood that although the description is described in terms of implementations, not every implementation includes only one independent technical solution. This narrative way of the description is for clarity only, and those skilled in the art should take the description as a whole. The technical solutions in the embodiments can also be appropriately combined to form other implementations that can be understood by those skilled in the art.

What is claimed is:

1. A hand warmer with the function of portable power source, comprising
    an MCU (Microcontroller Unit) control module;
    a heating sheet control module;
    a mobile power supply control module; and
    a lithium battery module,
    wherein the MCU control module is separately connected to the heating sheet control module, the mobile power supply control module and the lithium battery module,
    wherein the lithium battery module is further separately connected to the heating sheet control module and the mobile power supply control module,
    wherein a heating source controlled by the heating control module is a heating sheet or a heating ceramic sheet, and
    wherein precise temperature control is performed on the heating sheet or the heating ceramic sheet by the MCU control module and the heating control module,
    wherein a pin button of the MCU controls a heating plate and a mobile power supply button, when the button is long-pressed, the MCU detects a long-press signal, the hand warmer with the function of portable power source enters a heating mode, and a corresponding position light is on, and the heating sheet works, when the heating sheet works, and the button pin button is short-pressed so that the temperature is set in three positions: low, middle and high.

2. The hand warmer with the function of portable power source according to claim 1, wherein the MCU control module comprises a single-chip microcomputer, an NTC (Negative Temperature Coefficient) detection module, and a position indicator light, and wherein the single-chip microcomputer is separately connected to the NTC detection module and the position indicator light.

3. The hand warmer with the function of portable power source according to claim 2, wherein a control switch is provided on the single-chip microcomputer.

4. The hand warmer with the function of portable power source according to claim 2, wherein the position indicator light uses an LCD (Liquid Crystal device) display screen to indicate a position, and wherein positions are indicated by the indicator light with three different colors on the LCD display screen.

5. The hand warmer with the function of portable power source according to claim 1, wherein the mobile power supply control module comprises a charging module, a charging and discharging amount indicating module, and a discharging module.

6. The hand warmer with the function of portable power source according to claim 5, wherein the charging and discharging amount indicating module comprises a 25% indicator light, a 50% indicator light, a 75% indicator light, and a 100% indicator light.

* * * * *

US010939504C1

(12) EX PARTE REEXAMINATION CERTIFICATE (12468th)
United States Patent
Zhang

(10) Number: US 10,939,504 C1
(45) Certificate Issued: Dec. 15, 2023

(54) HAND WARMER WITH THE FUNCTION OF PORTABLE POWER SOURCE

(71) Applicant: Shenzhen Yilian Youchuang Network Co., LTD, Shenzhen (CN)

(72) Inventor: Jun Zhang, Gongan County (CN)

(73) Assignee: SHENZHEN STREET CAT TECHNOLOGY CO., LTD., Shenzhen (CN)

Reexamination Request:
No. 90/015,169, Nov. 30, 2022

Reexamination Certificate for:
Patent No.: 10,939,504
Issued: Mar. 2, 2021
Appl. No.: 16/778,185
Filed: Jan. 31, 2020

(30) Foreign Application Priority Data

Nov. 20, 2019  (CN) .......................... 201911144220.0

(51) Int. Cl.
H05B 3/22 (2006.01)
H02J 7/00 (2006.01)
H01M 10/052 (2010.01)

(52) U.S. Cl.
CPC ............ *H05B 3/22* (2013.01); *H01M 10/052* (2013.01); *H02J 7/0042* (2013.01); *H02J 7/0047* (2013.01); *H02J 7/0068* (2013.01); *H01M 2220/30* (2013.01)

(58) Field of Classification Search
None
See application file for complete search history.

(56) References Cited

To view the complete listing of prior art documents cited during the proceeding for Reexamination Control Number 90/015,169, please refer to the USPTO's Patent Electronic System.

*Primary Examiner* — Stephen J. Ralis

(57) ABSTRACT

The present application discloses a hand warmer with the function of portable power source, comprising an MCU control module, a heating sheet control module, a mobile power supply control module, and a lithium battery module, wherein the MCU control module is separately connected to the heating sheet control module, the mobile power supply control module and the lithium battery module, and the lithium battery module is further separately connected to the heating sheet control module and the mobile power supply control module. The hand warmer with the function of portable power source has a precise circuit design that allows users to precisely adjust the heating temperature as needed, and is well combined with a mobile power supply.

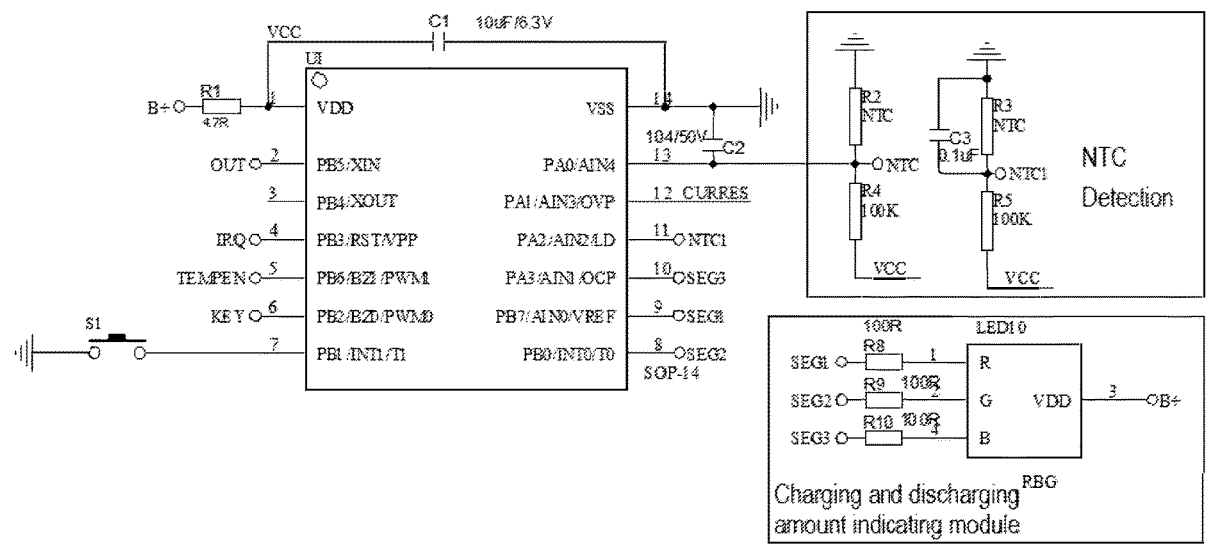

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-6 are cancelled.

\* \* \* \* \*